United States Patent [19]

Smith et al.

[11] Patent Number: 5,223,159
[45] Date of Patent: Jun. 29, 1993

[54] DELAYED BREAKING METAL CROSSLINKED POLYMER COMPOSITIONS

[76] Inventors: William H. Smith, Box 212, Walters, Okla. 73572; Jimmie D. Weaver, Rte. 4, Box 231B1, Duncan, Okla. 73533

[21] Appl. No.: 819,154

[22] Filed: Jan. 9, 1992

Related U.S. Application Data

[63] Continuation of Ser. No. 774,436, Oct. 10, 1991, abandoned, which is a continuation-in-part of Ser. No. 671,048, Mar. 18, 1991, abandoned.

[51] Int. Cl.$^5$ .............................................. E21B 43/26
[52] U.S. Cl. ............................ 252/8.551; 252/8.554; 252/327; 166/308; 166/295; 166/300
[58] Field of Search ............... 252/8.551, 8.554, 327; 166/308, 295, 271, 280, 300

[56] References Cited

U.S. PATENT DOCUMENTS

| | | | |
|---|---|---|---|
| 3,630,285 | 12/1971 | Claytor, Jr. | 166/300 |
| 3,960,736 | 6/1976 | Free et al. | 252/8.551 |
| 3,990,978 | 11/1976 | Hill | 252/8.551 |
| 4,018,286 | 4/1977 | Gall et al. | 166/295 |
| 4,169,818 | 10/1979 | DeMartino | 252/8.551 |
| 4,336,145 | 6/1982 | Briscoe | 252/8.551 |
| 4,353,805 | 10/1982 | Kragen et al. | 252/8.554 |
| 4,428,432 | 1/1984 | Pabley | 166/302 |
| 4,488,601 | 12/1984 | Hammett | 166/300 |
| 4,692,254 | 9/1987 | Kucera | 252/8.551 |
| 4,761,466 | 8/1988 | Himes et al. | 166/308 |
| 4,770,796 | 9/1988 | Jacobs | 252/8.553 |
| 4,797,216 | 1/1989 | Hodge | 252/8.551 |
| 4,928,763 | 5/1990 | Falk | 166/295 X |
| 4,928,766 | 5/1990 | Hoskin | 523/130 |
| 4,960,527 | 10/1990 | Penny | 252/8.551 |
| 4,986,356 | 1/1991 | Lockhart et al. | 166/300 |
| 5,007,481 | 4/1991 | Williams et al. | 166/300 |
| 5,048,609 | 9/1991 | Tackett, Jr. et al. | 166/295 |
| 5,067,566 | 11/1991 | Dawson | 252/8.551 X |
| 5,082,056 | 1/1992 | Tackett, Jr. | 166/295 |

*Primary Examiner*—Gary Geist
*Attorney, Agent, or Firm*—Thomas R. Weaver

[57] ABSTRACT

A new method is provided for improved degradation of metal-crosslinked polymer gels which are useful in oil and gas well treating operations. In this method an esterified carboxylated chelator is added to the gel. At elevated temperatures, the esterified chelator undergoes hydrolysis to form an acid and an active ligand which subsequently removes the crosslinking metal ion from the gel and hydrolyses the polymer.

7 Claims, No Drawings

DELAYED BREAKING METAL CROSSLINKED POLYMER COMPOSITIONS

CROSS REFERENCE TO RELATED APPLICATIONS:

This application is a continuation of prior copending application Ser. No. 07/774,436 filed Oct. 10, 1991, now abandoned, which is a continuation-in-part of prior copending application Ser. No. 07/671,048 filed Mar. 18, 1991, now abandoned.

BACKGROUND OF THE INVENTION

1. Field of the Invention

This invention relates to methods and compositions for treating subterranean formations. More particularly it relates to methods and compositions for treating a subterranean formation penetrated by a wellbore wherein a gel having a high viscosity formed from a metal-crosslinked polymer is injected into the wellbore or the formation through a suitable conduit. This invention specifically relates to a method and composition for reducing the viscosity of the gel.

2. Brief Description of Prior Art

Viscous treating fluids are commonly utilized in the drilling, completion, and treatment of subterranean formations penetrated by wellbores. Upon completion of the treatment, it is ordinarily desirable to remove the treating fluid from the well. To effectively remove the fluid, the viscosity of the fluid must be reduced. The reduction of fluid viscosity is referred to as "breaking" the gel.

A viscous treating fluid used in the treatment of subterranean formations is normally comprised of a polysaccharide or synthetic polymer in an aqueous solution which is crosslinked with an organometallic compound. Examples of well treatments in which metal-crosslinked polymers are used are hydraulic fracturing, gravel packing operations, water blocking, and other well completion operations.

In hydraulic fracturing applications a viscous treating fluid is used to transport propping materials to the formation. The treating fluid is introduced at a rate and pressure sufficient to produce a fracture or fractures in the subterranean formation and to extend the produced fracture or fractures from the wellbore into the formation. Upon the creation of the fracture or fractures, additional treatment fluid containing the propping materials can be introduced into the fracture or fractures in order to prevent complete closure. The propped fracture creates a conductive channel extending from the wellbore into the formation to facilitate the flow of oil and gas from the formation to the wellbore.

Upon completion of a treatment, it is desirable to reduce the viscosity of the treating fluid so that it can be recovered from the formation. Various materials known as "breakers" have been used to reduce the viscosity of the treating fluids. Acids, enzymes, and oxidizers are commonly used to reduce the viscosity of metal-crosslinked polymer fluids. These known breakers are somewhat effective to reduce viscosity by degrading polymer chains of the treating fluid; however, they are relatively ineffective against the metal-crosslinked portion of the polymer.

The present invention provides a method for improved degradation of metal-crosslinked polymer fluids. The method reduces fluid viscosity by (1) generating an acid which degrades the polymer chains and (2) producing a strong metal-ion chelator which removes the metal ion from the polymer to thereby uncrosslink the polymer.

SUMMARY OF THE INVENTION

In accordance with the present invention, a method has been discovered that provides improved degradation of viscous treating fluids such as those used in well completion practices. Such treating fluids typically comprise a polymer in a fluid wherein the polymer is crosslinked with a metal ion to produce a highly viscous gel. In well completion operations it is often necessary to reduce the viscosity of the gel, i.e. "break" the gel, in order to remove the treating fluid from the well after the treatment is completed.

This invention discloses a composition for and a method of reducing the viscosity of a solution of a polymer crosslinked with a metal ion. The invention is directed to the use of a compound which is not a breaker for the crosslinked polymer, but which, with passage of time, converts to an active breaker for the crosslinked polymer. During the period of breaker inactivity, the polymer, while in a high viscosity condition, can be employed as a treating fluid for such purposes as fracturing, gravel packing and the like. After the passage of a period of time sufficient to enable the high viscosity polymer to perform as desired, the compound converts to a breaker which then acts to reduce the viscosity of the treating fluid to a value sufficiently low to enable convenient removal of the fluid from a well.

The specific active breaker employed herein is a chelating agent which removes from the crosslinked polymer the metal ion used to crosslink the polymer. By chelating and thus removing the metal ion from the polymer the viscosity of the polymer is reduced. Accordingly, the chemical association between the active breaker and metal ion must be greater than the chemical association between polymer and ion, but the association between the compound and the metal ion must be less than the association between the polymer and the metal ion.

Applicants herein have recognized and put to productive use the above relationship with the discovery that the esters of carboxylic acid chelating agents are not active as chelators, but, depending upon such factors as pH, temperature, and specific ester substituent, with time convert to active chelating agents.

In short, it has been discovered that an inactivated chelating agent is useful as a delayed gel breaker. The esters employed herein are not functionally equivalent to the carboxylic acid chelating agents, because the function of the chelating agent to perform as a gel breaker is blocked on a temporary basis.

The method of the present invention comprises injecting into the wellbore or the subterranean formation a fluid, containing a polymer crosslinked by a metal ion and an ester of a carboxylic acid.

The carboxylic acids useful herein can be any such acid having chelating properties, however, those preferred have multi dentate sites. Accordingly, the preferred chelating agents are polycarboxylic acids and the currently most preferred are aminopolycarboxylic acids.

Examples of esters of carboxylic acids include esters of ethylenediaminetetraacetic acid (EDTA), esters of nitrilotriacetic acid (NTA) esters of citric acid and esters of hydroxyacetic acid. The esterified carboxylated chelator is relatively inactive initially, but undergoes hydrolysis to produce an acid and an active ligand. The rate of conversion of the ester depends among other things, upon the temperature, pH and ester substituents. The produced acid initiates degradation of the polymer chain and the active ligand removes the metal ion from the polymer to allow further degradation of the polymer, which in turn reduces the viscosity.

DETAILED DESCRIPTION OF THE INVENTION

The present invention provides a method for improved degradation of metal-crosslinked polymers. The method of the invention is effective to at least partially remove concentrated gels, skins, or plugs which may be formed as the result of using viscous fluids during the performance of a variety of well completion practices, such as hydraulic fracturing or temporary wellbore plugging.

In performing various well stimulation practices, an aqueous treating fluid is prepared which comprises a polymer, a crosslinking agent, and various other treating fluid additives such as pH buffers, biocides, stabilizers, and other additives. The aqueous fluid can also contain salt, but the presence of salt is not essential for the practice of this invention. Typical salts which are used in well stimulation treating fluids include potassium chloride, magnesium chloride, sodium chloride, calcium chloride, other such salts, and mixtures of salts. The aqueous fluid can also be a salt water-alcohol solution having in the range of from about 0 to about 80 percent alcohol by volume. Typically the alcohols used for treating fluids have from 1 to 5 carbon atoms. The aqueous fluid can also contain liquid or gaseous carbon dioxide, nitrogen gas or the like.

The aqueous fluid is used to solvate or hydrate the polymer. The polymers useful in the present invention must be capable of reacting with various metal ion crosslinkers. Examples of these polymers include solvatable polysaccharides which include the galactomannan polymers, glucomannan polymers, and their derivatives. Typical examples include guar and its derivatives; and modified cellulose such as hydroxyethyl cellulose derivatives, carboxymethyl cellulose, and other modified celluloses. Synthetic polymers which are capable of forming a crosslink with metal ions are also useful in the present invention. Examples of crosslinkable synthetic polymers include polyacrylamides, poly 2-amino-2-methyl propane sulfonic acid, and various other synthetic polymers and copolymers. In this instance, the method of the present invention removes the metal ion from the crosslinked complex thereby reducing the viscosity of the solution to a value near that of water.

The polymer is present in the aqueous fluid in an amount in the range of from about 0.2 to about 2.0 parts by weight polymer per 100 parts by weight aqueous fluid. The selection of a polymer concentration depends upon the actual well conditions and the type of well treatment which is to be effected.

The pH of the aqueous fluid which contains the polymer can be adjusted if necessary to render the fluid compatible with a crosslinking agent which is used to increase the viscosity of the polymer solution. The pH adjusting material can be added to the aqueous fluid before, during or after the addition of the polymer to the aqueous fluid. Typical materials for adjusting the pH are commonly used acids, acid buffers and mixture of acids and bases. For example, hydrochloric acid, fumaric acid, sodium bicarbonate, sodium diacetate and sodium carbonate are typical pH adjusting agents. The pH range for the fluid and method of the present invention is from about 4 to about 12.

Crosslinking compounds suitable for the present invention include the variety of well-known organometallic chelates. Organic chelates of titanium, zirconium, aluminum, as well as other metals are well known to those skilled in the art. The selection of an appropriate crosslinking agent depends upon the type of treatment to be performed and the polymer to be used. The amount of the crosslinking agent used also depends upon the well conditions and the type of treatment to be effected, but is generally in the range of from about 0.01 to about 0.6 parts by weight crosslinking agent per 100 parts by weight of the aqueous fluid. In some applications the aqueous polymer solution is crosslinked immediately upon addition of the crosslinking agent to form a highly viscous gel. In another application, the reaction of the crosslinking compound can be retarded so that viscous gel formation does not occur until the desired time.

After the treating fluid is formed as discussed above, and has been pumped into a subterranean formation, it is generally desirable to convert the highly viscous gel to a low viscosity fluid. This allows the fluid to be easily and effectively removed from the formation and to allow desired material such as oil or gas, to flow into the wellbore. This reduction in viscosity of the treating fluid is commonly referred to as "breaking".

There are various methods available for breaking treating fluid. Fluids typically break after the passage of time and/or prolonged exposure to high temperatures. However, it is highly desirable to be able to predict and control the breaking within relatively narrow limits. Mild oxidizing agents are useful as breakers when a fluid is used in a relatively high temperature formation, although formation temperatures of 300° F. or greater will generally break the fluid relatively quickly without the aid of an oxidizing agent. One suitable oxidizing agent is ammonium persulfate. Enzymes are used as breakers for treating fluids which are used at formation temperatures below 140° F. Suitable enzymes for use are alpha and beta amylases, amyloglucosidase, oligoglucosidase, cellulase, and hemicellulase.

Often times addition of these typical breakers to the treating fluid results in insufficient breaking of the treating fluid. Insufficient breaking means that highly concentrated gels, skins, or plugs are detected visually or experimentally in the broken fluid. In other words, although the overall viscosity of the fluid has been reduced, localized areas of crosslinked polymer are still present. In treating subterranean formations the polymer fluid may become highly concentrated as aqueous fluid is lost to the formation. Such highly concentrated polymer gels resist further breaking and may cause plugging or at the very least impair the ability of fluids to flow from the formation.

In accordance with the present invention, a method has been discovered which provides improved degradation of metal ion-crosslinked polymer fluids. The addition of particular esterified carboxylated chelators to the metal-crosslinked polymer fluid results in substantially complete degradation of the fluid in a predictable time. It has been discovered that esterified carboxylated chelators produce—but are not themselves—highly effective breakers for metal-crosslinked polymer fluids and are particularly suitable for well completion practices.

In the ester form, a carboxylic acid molecule is rendered relatively inactive as a chelator. However, at elevated temperatures or various pH values, the ester undergoes hydrolysis to form a free, active ligand or chelator. It is believed that the method and fluid of the present invention utilizes both the acid production from hydrolysis and the liberation of an active and highly effective chelator for metal ions to achieve improved degradation of the treating fluid. The produced acid lowers the viscosity of the polymer chain of natural polymers, while the active chelator removes the metal ion which crosslinks the polymer chains, i.e., the chelator uncrosslinks the polymer.

Some esterified carboxylated chelators that are suitable for use in this invention include esterified forms of ethylenediaminetetraacetic acid (EDTA), nitrilotriacetic acid (NTA), citric acid and hydroxyacetic acid, among others.

It is believed that the association constant of the carboxylated chelator/metal ion complex is preferably at least one order of magnitude greater than the association constant of the polymer/metal ion complex. However, as long as the association constant of the carboxylated chelator/metal ion complex is greater, the esterified carboxylated chelator is suitable for use in the present invention.

While total esterification of the acid function is preferred, it is to be understood that total substitution is not required and that a partially esterified compound may perform satisfactorily in the method of the present invention. It is only required that the degree of substitution be sufficient to render the carboxylic acid ineffective as a metal ion complexor.

Esterified forms of the carboxylated chelators that are suitable for this method include alkyl and substituted alkyl esters having in the range of from about 1 to 20 carbon atoms per ester group. Such compounds would therefore include methyl ester, ethyl ester, propyl ester, and other homologs. Some specific compounds useful herein include the esters of tetracyclohexyl EDTA, tetra-1-octyl EDTA, tetra-n-butyl EDTA, tetrabenzyl EDTA and tetramethyl EDTA. The number of derivatives of the carboxylated chelators which may be used in the present invention is great and the numerous derivatives are known to those skilled in the art. The preferred esterified carboxylated chelators for practice of this invention are the esters of citric acid and the esters of EDTA, in particular, the tetramethyl ester, the tetracyclohexyl ester and the tetrabenzyl ester of EDTA.

The selection of a particular esterified carboxylated chelator depends upon the rate of breaking of the crosslinked polymer that is desired. The breaking rate of the treating fluid of this invention is affected by the formation temperature, pH of the treating fluid, and rate of hydrolysis of the ester among other factors. The concentration of the esterified carboxylated chelator in the treating fluid is generally an amount stoichiometrically equal to the amount of metal ion present in the treating fluid. However, to insure complete breaking, the preferred practice is to add slightly more than an equal molar amount. In practicing the present invention, conventional breakers, i.e. oxidizers or enzymes, may also be used and the amount of esterified carboxylated chelator to be added again depends upon the rate at which breaking is desired.

As previously stated, the esterified carboxylated chelator remains relatively inactive at low temperatures, but undergoes hydrolysis at elevated temperatures. The rate of hydrolysis with respect to temperature generally depends upon the ester substituents.

In one preferred process for carrying out this invention a viscous treating fluid containing an ester of a polycarboxylic acid is injected down a wellbore and into a subterranean formation at a pressure sufficient to fracture the formation. The treating fluid comprises an aqueous fluid which is prepared by adding from about 30 pounds to about 70 pounds of polymer to each 1,000 gallons of aqueous fluid. The typical polymers used in fracturing are polysaccharide polymers, but synthetic polymers may also be used. The pH of the aqueous fluid is adjusted to enable hydration of the polymer, as well as to achieve a pH compatible with the selected metal ion crosslinking agent.

In normal fracturing operations, a polymer fluid is first introduced into the wellbore which is then followed by the crosslinked polymer. The metal ion crosslinking agent is introduced into the polymer fluid as it is injected into the wellbore. The delayed breaker of the present invention can be introduced while the polymer is being solvated or can be introduced as the fluid is being injected into the wellbore.

After the aqueous fluid has been injected into the subterranean formation, the highly viscous fluid is heated as it travels through the formation. When the aqueous fluid is sufficiently heated to initiate hydrolysis of the ester, the carboxylate chelator is released. The free carboxylate chelator is then able to react with metal-ion of the crosslinked polymer. As the polymer degrades and becomes uncrosslinked by the carboxylate chelator, the fluid begins to convert to a low viscosity fluid. Over time the viscosity is so reduced that the fluid is easily removed from the well without substantial impairment of the formation.

The following examples are provided to illustrate the present invention but do not limit the invention in any way.

EXAMPLE 1

Samples of an aqueous crosslinked polymer containing an esterified chelating agent were prepared and subjected to a constant temperature of 180° F. and observed until the samples broke. The break time was recorded.

Recipe:
Brine, Calcium Bromide/Calcium Chloride 15.2 lb/gal
Polymer[1] 100 lb/1000 gal Brine pH adjusted w/HCl to 3.3 Crosslinking agent[2] 3.2 gal/1000 gal Brine Ester varies[3]

(1) The polymer was dihydroxypropyl-hydroxyethyl cellulose preconditioned in a solvent consisting of 70 percent by volume isopropyl alcohol and 30 percent by volume ethylene glycol at the rate of 3 ml solvent per gram of polymer.

(2) The crosslinking agent was a complex of zirconium in tetraethylamine.

(3) The ester was the tetramethyl ester of EDTA (20% active).

TABLE 1

| Sample No. | Results Ester X gal/1000 gal. Brine | Break Time, Hours |
|---|---|---|
| 1 | 3 | 79-94 |
| 2 | 10 | 54-69 |

Example 1 shows that a given crosslinked gel can be broken by addition thereto of an ester of EDTA and further that the length of time required to achieve the break can be increased by reducing the quantity of ester employed.

Example 1 also shows that the gel will crosslink in the presence of EDTA which has been esterified.

EXAMPLE 2

A quantity of hydrated polymer was prepared by admixing the ingredients identified in the following recipe and permitting the mixture to stand for a time sufficient to form a gel.

Water solution containing 2% KCl by weight of solution

| Polymer: hydroxpropyl guar | 40 lb/1000 gal water |
|---|---|
| fumaric acid | 2.5 lb/1000 gal water |
| sodium bicarborate | 2.5 lb/1000 gel water |

The gel was then mixed with 0.8 gal crosslinking agent per 1000 gal of gel to thereby form a crosslinked gel. The crosslinking agent was an organic complex of titanium.

Filter cake was prepared by passing the crosslinked gel at a temperature of 180° F. and 1000 PSIG through an Ohio Sandstone core having a permeability of 0.1 millidary. The filter cake was removed from the core and divided into samples of equal size.

A filter cake sample was then placed in a bottle containing 50 ml of 2% KCl solution. A quantity of tetramethyl ester of EDTA (20% active), as set out below, was then placed in each bottle containing a filter cake. The bottle was then placed in an oven maintained at 180° F. and observed. The time required to break the filter cake was recorded.

TABLE 2

| Sample No. | Results Ester, X gal/1000 gal. 2% KCL Solution | Break Time, Hours |
|---|---|---|
| 1 | 0 | did not break, no change in sample |
| 2 | 0.4 | some complex after 93 hours |
| 3 | 0.8 | 30 hours - break starts |
| 4 | 1.2 | 30 hours |
| 5 | 1.6 | 6-21 hours |

Example 2 shows that a filter cake produced by a crosslinked gel can be broken by contacting the cake with an ester of EDTA. The example also shows that the length of time required to break can be increased by reducing the quantity of ester employed.

EXAMPLE 3

A quantity of hydrated polymer was prepared in accordance with the following procedure.

| Recipe | |
|---|---|
| Tap Water | 1000 ml |
| KCl | 20 gm |
| gelling agent (dihydroxypropyl-hydroxyethyl-cellulose) | 12 gm |

The above ingredients were permitted to stand for two hours to form a gel and then an equimolar mixture of formic acid and sodium formate was added to the gel at the rate of 3 ml per liter of gel. The gelling agent was preconditioned by first mixing it with a solvent consisting of 70 percent by volume isopropyl alcohol and 30 percent by volume ethylene glycol at the rate of 3 ml solvent per gram of polymer.

The gel was then further treated as follows:

TABLE 3

| Sample No. | Gel, ml | EDTA, gm | Crosslinker*, ml | Time to Form Complex, Minutes |
|---|---|---|---|---|
| 1 | 150 | 0 | 0.48 | 25 |
| 2 | 150 | 0.36 | 0.48 | did not complex |

*Complex of zirconium in tetraethylamine

Example 3 shows that a given gel, similar to the one used in Example 1, will not form a crosslink in the presence of EDTA which is not esterified. The example also shows that a crosslink is formed in the absence of EDTA. Compare the results in Example 1 with the results in Example 3 and note that the esterified EDTA does not prevent crosslinking but will, after a delay, produce a break in the gel.

EXAMPLE 4

The rate of conversion of an ester of a polycarboxylic acid to the acid itself is a function of a number of factors including pH, temperature and ester substituent. Accordingly, for example, a crosslinked gel of known pH used to treat a subterranean formation of known temperature can be broken in a predicted time by appropriate selection of ester substituent for the particular polycarboxylic acid being employed as the breaker.

Since the rate at which an ester converts to the acid form does vary depending on the structure, a user, knowing temperature and pH conditions, may engage in limited laboratory work to aid in ester selection. The information contained in Table 4, which is a list of calculated hydrolysis rates of esters relative to the methyl ester substituent, may be used in conjunction with laboratory work to help calculate specific break times for specific esters.

TABLE 4

PREDICTED RELATIVE RATES OF HYDROLYSIS* OF ESTERIFIED CHELATING AGENTS

| Alcohol Group | Acid Group | Relative Hydrolysis Rate** |
|---|---|---|
| Methyl- | EDTA | 1.00 |
| n-Butyl- | EDTA | 1.34 |
| iso-Butyl | EDTA | 0.87 |
| 2-Butyl- | EDTA | 1.05 |
| t-Butyl- | EDTA | 0.65 |
| Benzyl- | EDTA | 1.50 |
| p-Methoxybenzyl- | EDTA | 1.13 |
| m-Methoxybenzyl- | EDTA | 1.16 |
| m-Chlorobezyl- | EDTA | 1.14 |
| p-Chlorobenzyl- | EDTA | 1.17 |
| Phenyl- | EDTA | 1.23 |
| Methyl- | Citric | 5.54 |

TABLE 4-continued

PREDICTED RELATIVE RATES OF HYDROLYSIS*
OF ESTERIFIED CHELATING AGENTS

| Alcohol Group | Acid Group | Relative Hydrolysis Rate** |
|---|---|---|
| Methyl- | NTA | 0.74 |
| Methyl- | Glycolic | 1.47 |

*These rates were calculated using Quanta Software after the method described by D. F. DeTar, S. Binzet and P. Darba, J. Org Chem. 1987, 52, 2074–2082
**First Ester Group

EXAMPLE 5

Samples of an aqueous crosslinked polymer containing an esterified chelating agent were prepared and subjected to a constant temperature of 150° F. and observed until the samples broke. The break time was recorded.

Recipe:
Brine, Calcium Chloride 9.0 lb/gal
Polymer[1] 120 lb/1000 gal Brine pH adjusted with an equimolar mixture of formic acid and sodium formate at the rate of 3 ml per liter of gel. Crosslinking agent[2] 3.84 gal/1000 gal Brine
Ester varies[3]

(1) The polymer was dihydroxypropyl-hydroxyethyl cellulose preconditioned in a solvent consisting of 70 percent by volume isopropyl alcohol and 30 percent by volume ethylene glycol at the rate of 3 ml solvent per gram of polymer.

(2) The crosslinking agent was a complex of zirconium in tetraethylamine.

(3) Various different esters of EDTA.

Example 5 shows that a given crosslinked gel can be broken by addition thereto of an ester of EDTA and further that the length of time required to achieve the break can be increased by reducing the quantity of ester employed.

Example 5 also shows that the gel will crosslink in the presence of EDTA which has been esterified.

TABLE 5

| EDTA Ester | Break Time | | | |
|---|---|---|---|---|
| | 15 gal 1000 gal | 20 gal 1000 gal | 25 gal 1000 gal | 50 gal 1000 gal |
| *tetra cyclohexanol | ~30 day | ~12 day | — | 45 hr/200° F. |
| **tetra Benzyl | ~19 hr. | — | ~16 hr. | — |
| ***tetra Isoamyl | ~24–27 hr. | — | ~17 hr. | — |

Note: 1 day = 24 hr.
*26% active
**45% active
***63% active

What is claimed is:

1. A composition useful for treating a subterranean formation, said composition being comprised of an aqueous fluid, an ester, and a polymer, said polymer being crosslinked with a metal ion;
   wherein said ester is a hydrolyzable ester of a carboxylated chelating agent for said metal ion selected from the group consisting of ethylenediaminetetraacetic acid esters, nitrilotriacetic acid esters, citric acid esters and hydroxyacetic acid esters, and further
   wherein the chemical association between said metal ion and said ester is less than the chemical association between said metal ion and said polymer and the chemical association between said metal ion and said chelating agent is greater than the chemical association between said metal ion and said polymer.

2. The composition of claim 1 wherein the concentration of said hydrolyzable carboxylated chelating agent ester is at least about stoichiometrically equal to the concentration of said metal ion in said composition.

3. The composition of claim 2 wherein said ester is selected from alkyl and substituted alkyl esters having in the range of from about 1 to about 6 carbon atoms per ester group on said carboxylated chelating agent.

4. The composition of claim 3 wherein said hydrolyzable carboxylated chelating agent ester is selected from the group consisting of the tetramethyl ester of ethylenediaminetetraacetic acid and the tetracyclohexyl ester of ethylenediaminetetraacetic acid.

5. The composition of claim 4 wherein the pH of said composition is in the range of from about 4 to about 7 and said hydrolyzable carboxylated chelating agent is the tetramethyl ester of ethylenediaminetetraacetic acid.

6. The composition of claim 5 wherein said polymer is selected from polysaccharides and synthetic polymers which are capable of forming a crosslink with a metal ion.

7. The composition of claim 6 wherein said metal ion is selected from the group consisting of titanium, zirconium and aluminum.

* * * * *